United States Patent
Choi (10) Patent No.: US 8,984,560 B2
(45) Date of Patent: Mar. 17, 2015

(54) APPARATUS FOR RECEIVING BROADCAST IN PROCESSING BROADCAST PROGRAM RESERVED FOR VIEWING AND METHOD THEREOF

(75) Inventor: Eun Hae Choi, Gumi-si (KR)

(73) Assignee: LG Electronics Inc., Seoul (KR)

( * ) Notice: Subject to any disclaimer, the term of this patent is extended or adjusted under 35 U.S.C. 154(b) by 1328 days.

(21) Appl. No.: 12/440,878

(22) PCT Filed: May 21, 2007

(86) PCT No.: PCT/KR2007/002454
§ 371 (c)(1),
(2), (4) Date: Aug. 3, 2009

(87) PCT Pub. No.: WO2008/032919
PCT Pub. Date: Mar. 20, 2008

(65) Prior Publication Data
US 2010/0037268 A1 Feb. 11, 2010

(30) Foreign Application Priority Data
Sep. 12, 2006 (KR) ........................ 10-2006-0087790

(51) Int. Cl.
H04N 5/445 (2011.01)
H04N 5/76 (2006.01)
G06F 3/00 (2006.01)
(Continued)

(52) U.S. Cl.
CPC ......... *H04N 21/482* (2013.01); *H04N 5/44543* (2013.01); *H04N 21/4263* (2013.01); *H04N 21/4333* (2013.01); *H04N 21/4334* (2013.01); *H04N 21/4583* (2013.01); *H04N 21/47214* (2013.01)

USPC .................. 725/58; 725/38; 725/39; 725/56; 386/238

(58) Field of Classification Search
None
See application file for complete search history.

(56) References Cited

U.S. PATENT DOCUMENTS 7,051,280 B1    5/2006  Ko
2002/0087981 A1*  7/2002  Daniels .......................... 725/38
(Continued)

FOREIGN PATENT DOCUMENTS

CN           1668094 A    9/2005
KR    10-2003-0062706 A    7/2003
(Continued)

*Primary Examiner* — Nasser Goodarzi
*Assistant Examiner* — Fred Peng
(74) *Attorney, Agent, or Firm* — Birch, Stewart, Kolasch & Birch, LLP (57) ABSTRACT

An apparatus for receiving a broadcast in processing a viewing-reserved broadcast program and method thereof are disclosed. The present invention includes displaying a first broadcast program (102), checking whether a second broadcast program set for a viewing reservation exists (104) while the first broadcast program is displayed, if the viewing-reserved second broadcast program exists, displaying the second broadcast program instead of the first broadcast program at a timing point of setting the viewing reservation, and while the second broadcast program is displayed, storing the first broadcast program (106) having a progress overlapped with that of the second broadcast program. Accordingly, the present invention is able to avoid missing important contents of the previously displayed broadcast program according to the display switching attributed to the overlapped viewing reservation. And, it is also unnecessary to switch the channels to view the previously displayed broadcast program again.

16 Claims, 4 Drawing Sheets

(51) Int. Cl.
  *G06F 13/00* (2006.01)
  *H04N 21/482* (2011.01)
  *H04N 21/426* (2011.01)
  *H04N 21/433* (2011.01)
  *H04N 21/458* (2011.01)
  *H04N 21/472* (2011.01)

(56) References Cited

U.S. PATENT DOCUMENTS

| | | | |
|---|---|---|---|
| 2002/0174430 A1* | 11/2002 | Ellis et al. | 725/46 |
| 2005/0060755 A1* | 3/2005 | Daniels | 725/134 |
| 2005/0081242 A1* | 4/2005 | Kwok | 725/58 |
| 2005/0138659 A1* | 6/2005 | Boccon-Gibod et al. | 725/58 |
| 2005/0198670 A1* | 9/2005 | Nishimoto | 725/58 |
| 2005/0204396 A1 | 9/2005 | Kang | |
| 2007/0047905 A1* | 3/2007 | Ahn | 386/83 |

FOREIGN PATENT DOCUMENTS

| | | |
|---|---|---|
| KR | 10-2004-0023009 A | 3/2004 |
| KR | 10-2005-0056612 A | 6/2005 |
| KR | 10-2006-0056500 A | 5/2006 |

\* cited by examiner

APPARATUS FOR RECEIVING BROADCAST IN PROCESSING BROADCAST PROGRAM RESERVED FOR VIEWING AND METHOD THEREOF

TECHNICAL FIELD

The present invention relates to a broadcast reception, and more particularly, to an apparatus for receiving a broadcast and method thereof. Although the present invention is suitable for a wide scope of applications, it is particularly suitable for processing a broadcast program reserved for a viewing by a user.

BACKGROUND ART

Generally, a television as a broadcast receiver is a device for displaying a broadcast program on a screen by selecting a broadcast signal transmitted by a broadcasting station according to a user's selection. The broadcast receiver is in transition from an analog system to a digital system to keep up with the development of the multimedia technology. Since the digital system provides channels more than those of the analog system, a number of digital broadcast programs provided by a broadcasting station considerably increases. In digital broadcasting, signals are transmitted by PSIP (program and system information protocol).

And, digital TV broadcasting provides electronic program guide (EPG) information together with broadcast programs for user's convenience and facilitation. A user is facilitated to check a schedule of broadcast programs using the EPG information and also able to make a reservation for a viewing of a program to be broadcasted. If a plurality of programs differ from each other in start time, a user is able to reserve viewings of a plurality of the broadcast programs. So, under the circumstance that a single broadcast program is in progress, another broadcast program reserved for its viewing can be displayed regardless of a progress termination of the corresponding broadcast program.

However, in this situation, the user may miss an important part of the previous broadcast program unless manually storing the previously viewed program or making a manual channel switching.

Moreover, in shifting a display of a viewed broadcast program to a display of a different viewing-reserved broadcast program, if the user attempts to manually store the previously viewed broadcast program considered as important, a storage of the corresponding broadcast program should be set after checking a presence or non-presence of a doubly storage reserved broadcast program using EPG.

DISCLOSURE OF INVENTION

Accordingly, the present invention is directed to an apparatus for receiving a broadcast in processing a viewing-reserved broadcast program and method thereof that substantially obviate one or more problems due to limitations and disadvantages of the related art.

An object of the present invention is to provide an apparatus for receiving a broadcast in processing a viewing-reserved broadcast program and method thereof, by which a previously displayed broadcast program can be easily stored according to an automatic storage, a user's setting, a query on an OSD image, or the like if a currently displayed broadcast program in being viewed by a user is replaced by a viewing-reserved broadcast program.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of receiving a broadcast in processing a viewing-reserved broadcast program according to the present invention includes the steps of displaying a first broadcast program, checking whether a second broadcast program set for a viewing reservation exists while the first broadcast program is displayed, if the viewing-reserved second broadcast program exists, displaying the second broadcast program instead of the first broadcast program at a timing point of setting the viewing reservation, and while the second broadcast program is displayed, storing the first broadcast program having a progress overlapped with that of the second broadcast program.

In another aspect of the present invention, a method of receiving a broadcast in processing a viewing-reserved broadcast program includes the steps of storing a viewing-reserved first broadcast program by time shift while displaying the viewing-reserved first broadcast program, checking whether a second broadcast program set for a viewing reservation exists while the first broadcast program is displayed, if the viewing-reserved second broadcast program exists, storing the second broadcast program by time shift while displaying the second broadcast program instead of the first broadcast program at a timing point of setting the viewing reservation, while the second broadcast program is displayed, continuously storing the first broadcast program having a progress overlapped with that of the second broadcast program by non-time shift, displaying a third broadcast program instead of the second broadcast program according to a request made by a user, and while the third broadcast program is displayed, storing at least one previously displayed broadcast program displayed before the third broadcast program is displayed, and a progress of the at least one previously displayed broadcast program being overlapped with that of the third broadcast program.

In another aspect of the present invention, an apparatus for receiving a broadcast in processing a viewing-reserved broadcast program includes a tuning unit receiving at least one or more broadcast programs in response to a tuning control signal, a memory storing information for a viewing reservation of the broadcast program, a storage unit storing at least one previously displayed broadcast program having a progress overlapped with that of a currently displayed broadcast program in response to a storage control signal, and a central processing unit generating the tuning control signal and the storage control signal to correspond to the information.

In another aspect of the present invention, an apparatus for receiving a broadcast in processing a viewing-reserved broadcast program includes a tuning unit receiving at least one or more broadcast programs in response to a tuning control signal, a memory storing information for a viewing reservation of the broadcast program, a user interface unit generating a display switching request signal if a display switching of the broadcast program is requested by a user, a storage unit continuously storing at least one previously displayed broadcast program having a progress overlapped with that of a currently displayed broadcast program in response to a storage control signal, the storage unit storing the currently displayed broadcast program, and a central processing unit generating the tuning control signal and the storage control signal, corresponding to the information and the display switching request signal.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Embodiments of a method of receiving a broadcast according to the present invention are explained with reference to FIG. 1 and FIG. 2 as follows.

Figure 1:
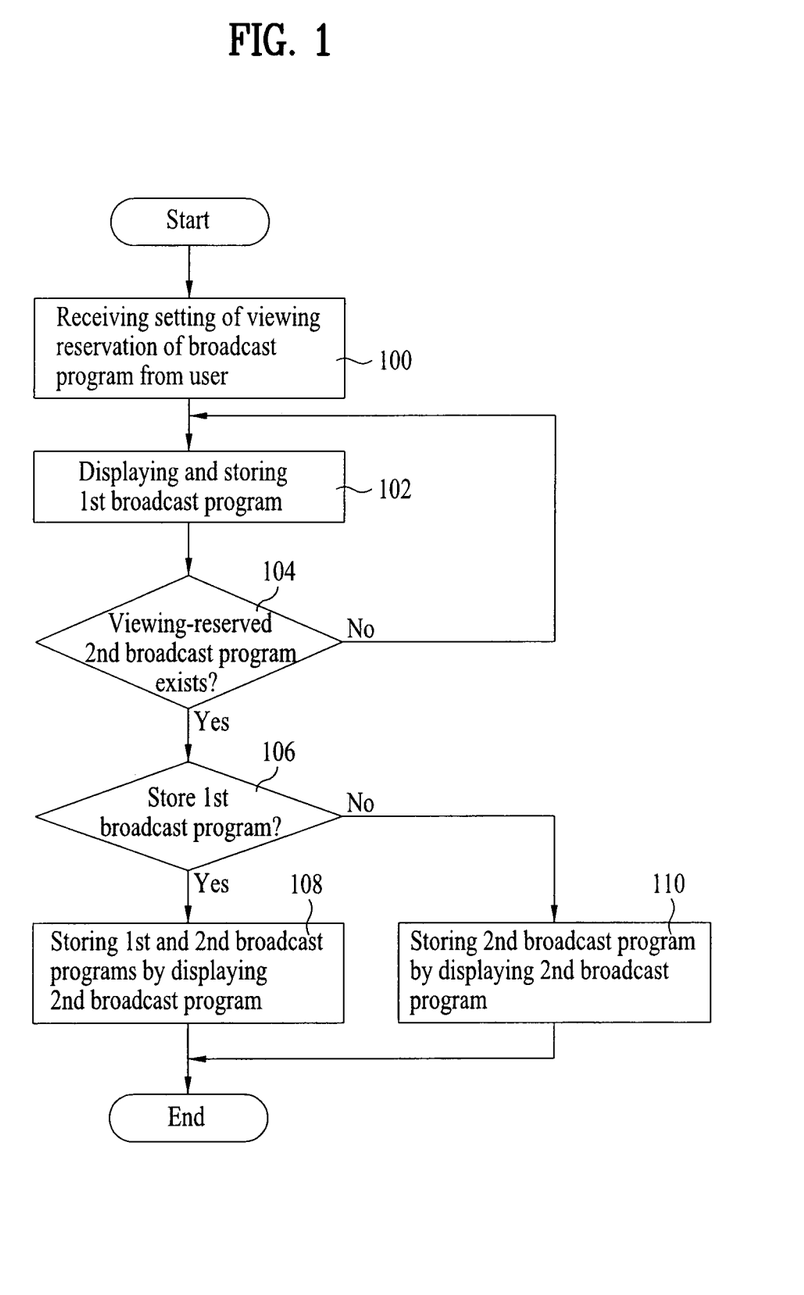
FIG. 1 is a flowchart of a method of receiving a broadcast in processing a viewing-reserved broadcast program according to one embodiment of the present invention.
Figure 2:
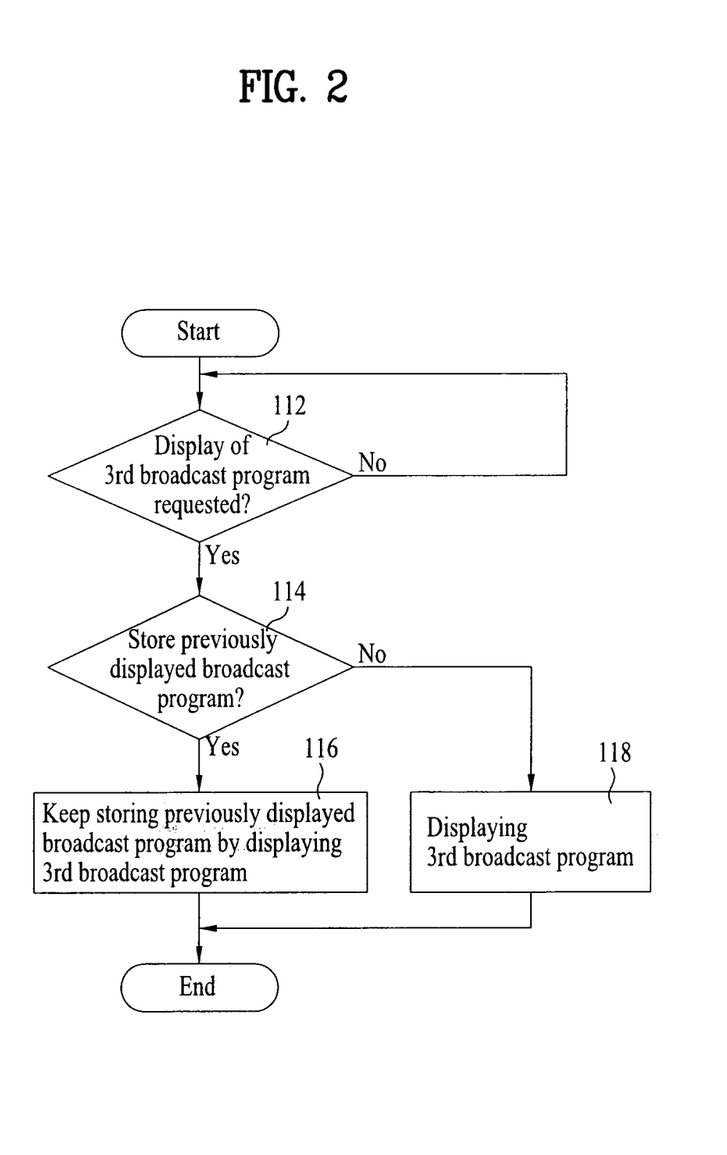
FIG. 2 is a flowchart of a method of receiving a broadcast in processing a viewing-reserved broadcast program according to another embodiment of the present invention.

FIG. 1 is a flowchart of a method of receiving a broadcast in processing a viewing-reserved broadcast program according to one embodiment of the present invention, and FIG. 2 is a flowchart of a method of receiving a broadcast in processing a viewing-reserved broadcast program according to another embodiment of the present invention.

First of all, a reservation for viewing a broadcast program is set by a user (S100). For instance, in order to set a viewing reservation of a specific broadcast program, a user is able to use electronic program guide (hereinafter abbreviated EPG) information. In case of setting the viewing reservation using the EPG information, even if a viewing time of a broadcast program is changed, a viewing-reserved broadcast program corresponding to the changed viewing time can be displayed.

After completion of the step S100, a broadcast program specified by the user among a plurality of broadcast programs is displayed (S102). In the step S102, the displayed broadcast program is named 'first broadcast program'. In particular, the first broadcast program may be a viewing-reserved program or a viewing-unreserved program. In case that a first broadcast program is a viewing-reserved program, if a viewing reservation time of the first broadcast program comes up while a user is viewing another broadcast program, the first broadcast program is displayed at the viewing reservation time. The first broadcast program can be stored by time shift (TS) as soon as displayed. In this case, the time shift means that a broadcast program currently viewed by a user is temporarily stored. By the time shift, a user is able to resume a viewing of a broadcast program despite his absence in the course of viewing the corresponding broadcast program.

After completion of the step S102, it is checked whether there exists a viewing-reserved broadcast program exists while a broadcast program is displayed (S104). In the step S104, the viewing-reserved broadcast program of which existence is checked is named 'second broadcast program'. If the second broadcast program is decided to exist while the first broadcast program is displayed, it is checked whether the first broadcast program will be stored while the second broadcast program is displayed (S106). The step S106 is executed prior to a display switching to the second broadcast program from the first broadcast program.

According to the embodiment of the present invention, whether to store the first broadcast program in the course of displaying the second broadcast program can be set in advance by a user. If the user sets whether to store the first program in advance, a step S108 is executed with default if in the second step S104 it is decided that there exists the second broadcast program.

According to another embodiment of the present invention, whether to store the first broadcast program in the course of displaying the second broadcast program can be requested by real time by the user. For instance, if an OSD (on-screen display) picture for querying whether a user attempts a storage of the first broadcast program is provided, the user is able to decide whether to store the first broadcast program via the OSD picture. Alternatively, a user is able to make a direct request of the storage of the first broadcast program via a manipulation of a keypad (not shown in the drawing) as a user interface without a help of the OSD picture.

Meanwhile, if in the step S106 it is decided that the storage of the first broadcast program is requested, the second broadcast program is displayed at the viewing reservation time instead of the first broadcast program (S108). In this case, the first broadcast program, of which progress is overlapped with that of the second broadcast program while the second broadcast program is displayed, is stored by non-time shift (NON-TS) as soon as a display switching is performed. In case of TS, a broadcast program is stored using a limited storage space. So, if a size of a broadcast program to be stored exceeds a limited storage space, a newly introduced broadcast program is stored as soon as a previously stored broadcast program is erased. Yet, in case of NON-TS, a broadcast program is stored using a storage space enough to store a first broadcast program, a second broadcast program, and/or a third broadcast program. So, in case of NON-TS, it is able to keep storing a specific broadcast program without erasing a previously stored broadcast program. Thus, the first broadcast program is stored by TS while displayed. And, the first broadcast program is stored by NON-TS while the second broadcast program is displayed. So, it is able to store a total size of the first broadcast program from a start time to an end time. In order to keep the total size of the first broadcast program by NON-TS, it is able to re-store the first broadcast program, which was stored by TS, by NON-TS. Meanwhile, if a storage of the first broadcast program is not requested while the second broadcast program is displayed, the second broadcast program is displayed (S110). In the step S108 or S110, the second broadcast program can be stored by TS as soon as displayed.

The broadcast receiving method shown in FIG. 2 can be executed while the step S108 or S110 shown in FIG. 1 is executed. Alternatively, the broadcast receiving method shown in FIG. 2 can be executed while a step S116 or S118 itself is executed. This is explained in detail as follows.

First of all, in the step S108 or S110, if another doubly viewing reserved broadcast program does not exist while the second broadcast program is displayed or a re-display of a previously displayed broadcast program is not requested while the second broadcast program is displayed, the second broadcast program is stored by TS while displayed until the currently displayed second broadcast program ends. Yet, while the step S108 or S110 is executed, it is decided whether a display of a different broadcast program instead of the second broadcast program is requested by a user (S112). In the following description, the different broadcast program, for which a display request is decided in the step S112, is named 'third broadcast program'. In this case, the third broadcast program may become the first broadcast program or corresponds to a different broadcast program for which a viewing is reserved by a user.

If it is decided that a display of a third broadcast program is requested by a user, it is checked whether to store at least one of previously displayed broadcast programs while the third broadcast program is displayed (S114). For instance, if the method shown in FIG. 2 is executed in succession to the method shown in FIG. 1, while the third broadcast program is displayed, a progress of the first broadcast program can be overlapped with a progress of the third broadcast program as well as a progress of the second broadcast program. Since the user has decided whether to store the first broadcast program in the step S106, whether to store the first broadcast program may not be decided in the step S114. Yet, since it is possible for the user to change a result of deciding whether to store the first broadcast program in the step S106, whether to store the first broadcast program can be re-decided in the step S114. And, the step S114 is executed prior to the display switching to the third broadcast program.

If it is decided that the storage of the previously displayed broadcast program is requested, at least one of the previously displayed broadcast programs, of which progress is overlapped with that of the third broadcast program while the third broadcast program is displayed, is stored (S116). If a progress of the first broadcast program as well as a progress of the second broadcast program is overlapped while the third broadcast program is in progress, both of the first and second broadcast programs previously displayed are stored by NON-TS. Yet, if it is decided that the storage of the previously displayed broadcast program is not requested, the third broadcast program is simultaneously displayed and stored (S118). In the step S116 or S118, the third broadcast program may be stored by TS (time shift) as soon as displayed.

A configuration and operation of a broadcast receiver according to an embodiment of the present invention are explained with reference to FIG. 3 as follows.

Figure 3:
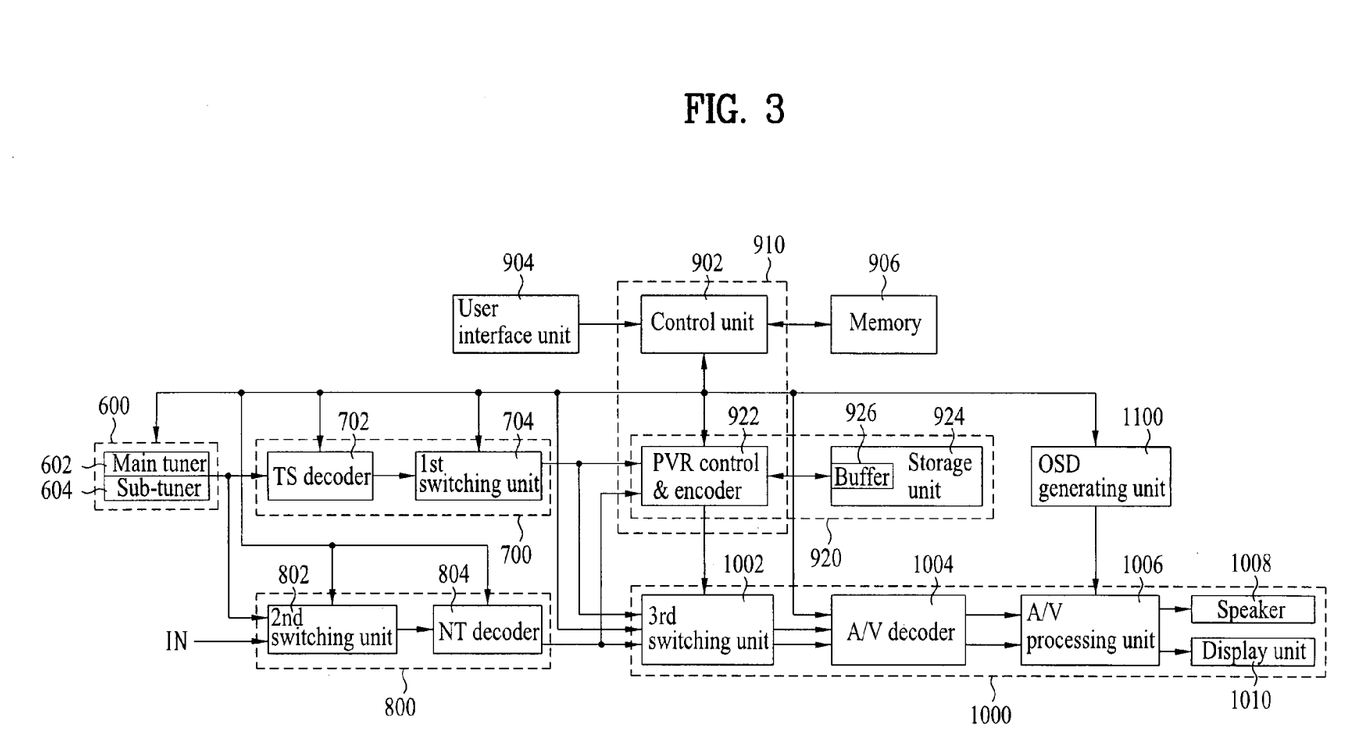
FIG. 3 is a block diagram of an apparatus for receiving a broadcast in processing a viewing-reserved broadcast program according to one embodiment of the present invention.

FIG. 3 is a block diagram of an apparatus for receiving a broadcast in processing a viewing-reserved broadcast program according to one embodiment of the present invention.

Referring to FIG. 3, an apparatus for receiving a broadcast according to one embodiment of the present invention includes a tuning unit 600, a digital broadcast signal processing unit 700, an analog broadcast signal processing unit 800, a user interface unit 904, a memory 906, a central processing unit 910, a storage unit 924, a broadcast signal output unit 1000, and an OSD generating unit 1100.

In response to a tuning control signal received from the central processing unit 910, the tuning unit 600 tunes a channel of a corresponding broadcast program from a plurality of broadcast programs received via terrestrial or cable. The tuning unit 600 outputs a digital broadcast signal received via the tuned channel to the digital broadcast signal processing unit 700. And, the tuning unit 600 outputs an analog broadcast signal received via the tuned channel to the analog broadcast signal processing unit 800. For this, the tuning unit 600 includes a man tuner 602 and at least one sub-tuner 604 to receive at least one broadcast program. The main tuner 602 receives a currently displayed broadcast program via the display unit 1010 in response to the tuning control signal, and the at least one sub-tuner 604 receives at least one broadcast program, which was previously displayed, in response to the tuning control signal. In particular, the main tuner 602 receives a broadcast program stored in the storage unit 924 by TS and the at least one sub-tuner 604 receives at least one broadcast program stored in the storage unit 924 by NON-TS.

The digital broadcast signal processing unit 700 for processing a digital broadcast signal includes a TS (transport stream) decoder 702 and a first switching unit 704. The TS decoder 702 decodes a digital broadcast signal provided by the tuning unit 600 into an audio stream, a video stream, and a data stream and then transfers the corresponding streams to the first switching unit 704. If so, the first switching unit 704 provides the audio/video (A/V) stream and the data stream to a PVR module unit 920 and/or the broadcast signal output unit 1000 under the control of the central processing unit 910.

The analog broadcast signal processing unit 800 for processing an analog broadcast signal includes a second switching unit 802 and an NT (NTSC) decoder 804. The second switching unit 802 selects either an analog broadcast signal provided by the tuning unit 600 or an external input signal inputted via an input terminal IN under the control of the central processing unit 910 and then provides the selected signal to an NT decoder 804. The NT decoder 804 decodes the analog broadcast signal or the external input signal into audio data and video data and then provides the audio data and the video data to the PVR module unit 920 and the broadcast signal output unit 1000.

The broadcast signal output unit 1000, which outputs broadcast data provided by the digital broadcast signal processing unit 700, the analog broadcast signal processing unit 800, or the PVR module unit 920, includes a third switching unit 1002, an A/V decoder 1004, an A/V processing unit 1006, a speaker 1008, and a display unit 1010. The third switching unit 1002 selects at least one of an output of the digital signal processing unit 700, an output of the analog signal processing unit 800, and an output of the PVR module unit 920 under the control of the control unit 920 and then provides the at least one selected output to the A/V decoder 1004. In case of being provided with audio and video streams, the audio/video decoder 1004 decodes the audio and video streams into audio data and video data and then provides the audio and video data to the A/V processing unit 1006. In case of being directly provided with audio data and video data, the A/V decoder 1004 intactly bypasses the provided data to the A/V processing unit 1006. The A/V processing unit 1006 processes at least one audio data and at least one video data provided by the A/V decoder 1004 and then outputs the audio data and the video data to the speaker 1008 and the display unit 1010, respectively.

The user interface unit 904 includes a keypad (not shown in the drawing) provided to a body of the broadcast receiving apparatus, a remote controller (not shown in the drawing), or the like. The user interface unit 904 transmits various kinds of commands or information inputted by a user to the central processing unit 910.

The memory 906 stores various kinds of information including a system program of the control unit 902.

The central processing unit 910 shown in FIG. 3 can be implemented with the control unit 902 for controlling the broadcast receiving apparatus overall. In case of having a personal video recorder (PVR) function of storage and reproduction of broadcast data, the broadcast receiving apparatus can further include the PVR module unit 920. In this case, the central processing unit 910 can be implemented with the control unit 902 and a PVR control & encoder 922.

The PVR module unit 920 for storing and reproducing a digital or analog broadcast signal includes the PVR control & encoder 922 and the storage unit 924. Under the control of the control unit 902, the PVR control & encoder 922 is provided with the audio, video and data streams of the broadcast program outputted by the digital broadcast signal processing unit 700 and then stores the provided streams in the storage unit 924. Under the control of the control unit 902, the PVR control & encoder 922 performs MPEG encoding on the audio and video data of the broadcast program outputted by the analog broadcast signal processing unit 800 into an audio stream and a video stream and then stores the streams in the storage unit 924. Under the control of the control unit 902, the PVR control & encoder 922 reads out the stream stored in the storage unit 924.

The storage unit 924 is a hard disc drive including a hard disc. The storage unit 924 stores audio, video and data streams of a broadcast program provided by the PVR control & encoder 922. The storage unit 924 includes a buffer 926 temporarily storing data outputted by the PVR control and encoder 922. In response to a storage control signal received from the central processing unit 910, the storage unit 924 stores at least one previously displayed broadcast program, of which progress is overlapped with a progress of a currently displayed broadcast program, by NON-TS. In response to a storage control signal, the storage unit 924 stores a currently displayed broadcast program by TS.

Details in performing the broadcast receiving method in the broadcast receiving apparatus shown in FIG. 3 according to the present invention are explained as follows.

First of all, a user sets a viewing reservation of at least one broadcast program of which progress is overlapped in part on a same time zone among a plurality of broadcast programs differing from each other in progress start time (S100).

In particular, a user sets a viewing reservation of a broadcast program via the user interface unit 904. The control unit 902 generates information for the viewing reservation using a status of the viewing reservation set by the user via the user interface unit 904 and then stores the generated information in the memory 906.

The control unit 902 generates a tuning control signal to enable a first broadcast program to be received via the main tuner 602. The control unit 902 controls the respective units 700, 800, 920, and 1000 to enable the received first broadcast program to be displayed via the display unit 1010 and stored in the storage unit 924 by TS (S102).

If the first broadcast program is a viewing-reserved broadcast program, the control unit 902 interprets the viewing reservation information read out from the memory 906 and then generates a tuning control signal at a viewing reservation time of the first broadcast program to enable the main tuner 602 to receive the first broadcast program.

If the first broadcast program is not a viewing-reserved broadcast program, the control unit 902 generates a tuning control signal to enable a broadcast program of a random channel set via the user interface unit 904 to be received via the main tuner 602.

Subsequently, the control unit 902 checks whether there exists a second broadcast program reserved for a viewing in a manner of interpreting the information read from the memory 906 while the first broadcast program is displayed via the display unit 1010 (S104).

If there exists the viewing-reserved second broadcast program, the control unit 902 checks whether to store the first broadcast program while the second broadcast program is displayed (S106). In this case, whether to store the first broadcast program can be previously set by a user via the user interface unit 904 and then stored in the memory 906. Alternatively, if there exists the viewing-reserved second broadcast program, the OSD generating unit 1100 generates an OSD data querying whether to store at least one previously displayed broadcast program and then provides the generated OSD data to the A/V processing unit 1006 under the control of the control unit 902. If so, the A/V processing unit 1006 mixes the OSD data provided by the OSD generating unit 1100 with video data and then provides the mixed data as an OSD picture via the display unit 1010. So, after viewing the OSD picture, a user informs the control unit 902 whether to store the previously displayed broadcast program via the user interface unit 904.

If a storage of the first broadcast program is requested, the control unit 902 generates a tuning control signal to enable a second broadcast program to be received via the main tuner 602 and the first broadcast program to be received via the sub-tuner 604 (S108). If the storage of the first broadcast program is requested, the PVR control & encoder 922 controls the storage unit 924 to enable the second broadcast program received via the main tuner 602 to be stored in the storage unit 924 by TS and the first broadcast program received via the sub-tuner 604 to be stored in the storage unit 924 by NON-TS, in response to the storage control signal provided by the control unit 902 (S108). In this case, the control unit 902 controls the broadcast signal output unit 1000 to display the second broadcast program. Yet, if the storage of the first broadcast program is not requested, the control unit 902 generates a tuning control signal to enable the second broadcast program to be received via the main tuner 602 and disenable the first broadcast program to be received via the sub-tuner 604.

Meanwhile, in case that the broadcast receiving method shown in FIG. 2 is executed in the course of executing the step S108 or S110 shown in FIG. 1, the broadcast receiving apparatus operates as follows.

First of all, while the second broadcast program is displayed, the control unit 902 checks whether a request for displaying a third broadcast program is made (S112). For instance, by interpreting information read from the memory 906, the control unit 902 checks a presence or non-presence of a viewing-reserved third broadcast program while a second broadcast program is displayed. Alternatively, via a display switching request signal received from the user interface unit 904, the control unit 902 checks a request for a display switching to a first broadcast program from a second broadcast program. And, the user interface unit 904 generates a display switching request signal if a request for a display switching to a first broadcast program from a second broadcast program is made by a user.

The control unit 902 checks whether a storage of at least one of first and second broadcast programs previously displayed is requested (S114). In this case, the query about the storage can be made to a user via the OSD picture. Using the checking result obtained from the executions of the steps S112 and S114, the control unit 902 generates a tuning control signal and a storage control signal.

If a storage of a previously displayed broadcast program is requested, the main tuner 602 receives a third broadcast program and the at least one sub-tuner 604 receives at least one previously displayed broadcast program, in response to the tuning control signal generated by the control unit 902 (S116). If a storage of a previously displayed broadcast program is requested, the PVR control & encoder 922 controls the third broadcast program received via the main tuner 602 to be displayed and simultaneously stored in the storage unit 924 by TS, in response to the storage control signal generated by the control unit 902. And, the at least one previously displayed broadcast program received via the sub-tuner 604 is controlled to be stored in the storage unit 924 by NON-TS from a timing point at which the least one previously displayed broadcast program stops being displayed. In this case, the control unit 902 controls the broadcast signal output unit 1000 to display the third broadcast program.

Yet, if a storage of a previously displayed broadcast program is not requested, the main tuner 602 receives the third broadcast program and the at least one sub-tuner 604 does not receive the previously displayed broadcast program, in response to the tuning control signal generated by the control unit 902 (S118).

Meanwhile, in case that the broadcast receiving method shown in FIG. 2 is executed in the course of executing the step S116 or S118 shown in FIG. 2, the broadcast receiving apparatus operates as follows.

First of all, while one third broadcast program (hereinafter named 'fourth broadcast program') is displayed, the control unit 902 checks whether a request for displaying another third broadcast program (hereinafter named 'fifth broadcast program') is made (S112). For instance, by interpreting information read from the memory 906, the control unit 902 checks a presence or non-presence of a viewing-reserved fifth broadcast program while a fourth broadcast program is displayed. Alternatively, via a display switching request signal received from the user interface unit 904, the control unit 902 checks a request for a display switching to a fifth broadcast program from a fourth broadcast program. And, the user interface unit 904 generates a display switching request signal if a request for a display switching to a fifth broadcast program from a fourth broadcast program is made by a user.

The control unit 902 checks whether a storage of at least one of previously displayed broadcast programs is requested (S114). Using the checking result obtained from the executions of the steps S112 and S114, the control unit 902 generates a tuning control signal and a storage control signal.

If a storage of a previously displayed broadcast program is requested, the main tuner 602 receives a fifth broadcast program and the at least one sub-tuner 604 receives at least one previously displayed broadcast program, in response to the tuning control signal generated by the control unit 902 (S116). If a storage of a previously displayed broadcast program is requested, the PVR control & encoder 922 controls the fifth broadcast program received via the main tuner 602 to be displayed and simultaneously stored in the storage unit 924 by TS, in response to the storage control signal generated by the control unit 902. And, the at least one previously displayed broadcast program received via the sub-tuner 604 is controlled to be stored in the storage unit 924 by NON-TS from a timing point at which the least one previously displayed broadcast program stops being displayed. In this case, the control unit 902 controls the broadcast signal output unit 1000 to display the fifth broadcast program.

Yet, if a storage of a previously displayed broadcast program is not requested, the main tuner 602 receives the fifth broadcast program and the at least one sub-tuner 604 does not receive the previously displayed broadcast program, in response to the tuning control signal generated by the control unit 902 (S118).

In the above explained examples, the control unit 902 enables a total broadcast size of a corresponding program to be stored in the storage unit 924 by NON-TS in a manner of inserting a broadcast program stored by TS in a broadcast program stored by NON-TS.

Figure 4:
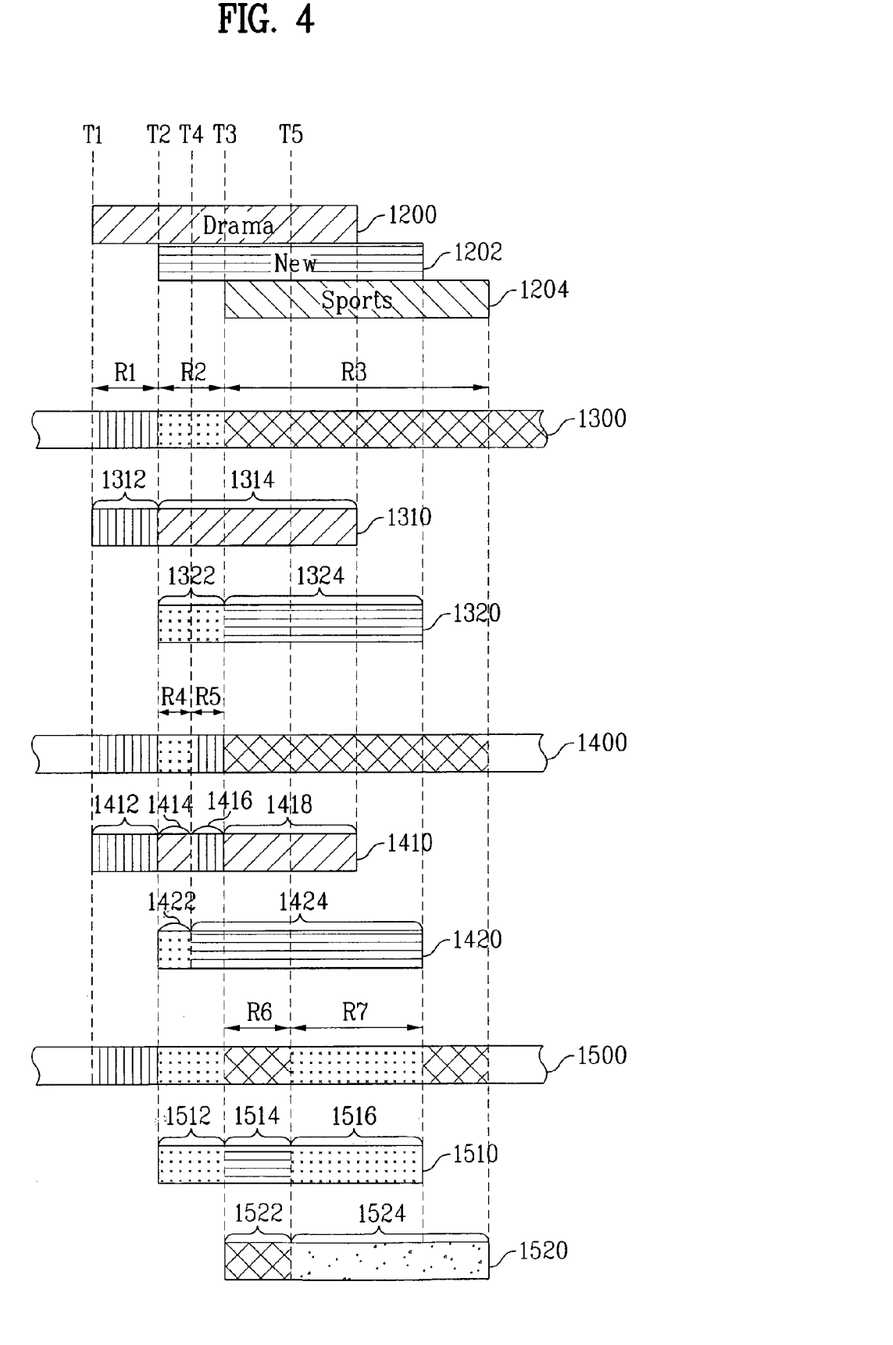
FIG. 4 is a diagram of an example of storing a broadcast program to help the understanding of a method and apparatus for receiving a broadcast according to the present invention.

To help the understanding of the present invention, the aforesaid broadcast receiving method and apparatus are explained with reference to FIG. 4, which does not restrict a scope of the present invention. FIG. 4 shows three broadcast programs 1200, 1202, and 1204 and three storage types for storing the broadcast programs, respectively.

Referring to FIG. 4, although broadcast progress start times T1, T2, and T3 differ from each other, a user is able to make reservations for viewing three broadcast programs 'drama', 'news', and 'sports' of which progresses are overlapped in part with each other, respectively (S100).

According to an order that a user views broadcast programs, it is able to store the broadcast programs in the storage unit 924 in various ways under the control of the central processing unit 910 as follows.

A first broadcast program storing type is applied to a case that a user sequentially views three broadcast programs 'drama', 'news', and 'sports' respectively reserved to be viewed at timing points T1, T2, and T3. In this case, the first broadcast program 'drama' is displayed for a period R1 between T1 and T2, the second broadcast program 'news' is displayed for a period R2 between T2 and T3, and the third broadcast program 'sports' is displayed for a period R3 between T3 and an end timing point of 'sports'.

A second broadcast program storing type is applied to a case that a user having been sequentially viewing the viewing-reserved 'drama' and 'news' starts to re-view the 'drama' at a timing point T4 in the course of viewing the 'news'. In this case, the first broadcast program 'drama' is displayed for the period R1, the second broadcast program 'news' is displayed for a period R4 between T2 and T4, the third broadcast program 'drama', i.e., the first broadcast program is displayed again for a period R5 between T4 and T3, and the viewing-reserved third broadcast program 'sports' is then displayed for the period R3.

And, a third broadcast program storing type is applied to a case that a user having been sequentially viewing the viewing-reserved 'drama', 'news' and 'sports' starts to re-view the 'news' at a timing point T5 in the course of viewing the 'sports'. In this case, the first broadcast program 'drama' is displayed for the period R1, the second broadcast program 'news' is displayed again for the period R2, the third broadcast program 'sports' is displayed for a period R6 between T3 and T5, and the third broadcast program 'news' is then displayed again for a period R7 between T5 and a timing point at which the 'news' ends.

In the respective storing types, a bar 1300, 1400, or 1500 indicates a status of storing a broadcast program by TS, a bar 1310 or 1410 indicates a status of storing 'drama', a bar 1320, 1420, or 1510 indicates a status of storing 'news', and a bar 1520 indicates a status of storing 'sports'.

The first storing type is explained as follows.

First of all, the method shown in FIG. 1 is performed for the periods R1 and R2 and the method shown in FIG. 2 is then executed from the timing point T3.

Referring to the bars 1300 to 1320, the first broadcast program 'drama' is displayed and stored by TS in the storage unit 924 for the period R1 from the timing point T1 (S102).

If the viewing-reserved second broadcast program 'news' exists while the 'drama' is displayed, the control unit 902 checks before the timing point T2 whether to store the 'drama' of which progress is overlapped with that of the 'news' (S106).

If a storage of the 'drama' is not requested for a period of displaying the 'news', a size 1312 for a period T2–T1 between a timing point T1 of starting to display the 'drama' and a timing point T2 of starting to display the 'news' is just stored by TS while the step S110 is executed. Yet, if a storage of the 'drama' is requested for a period R2 of displaying the 'news', the control unit 902 controls the respective units 600, 700, 920, and 1000 to enable a size 1312 of the 'news', instead of the 'drama', to be displayed and stored by TS for a period R2 from a timing point T2 of setting a viewing reservation (S108). In this case, although the 'drama' is not displayed while the 'news' is displayed, the 'drama' is received via the sub-tuner 604 and stored in the storage unit 924 by NON-TS under the control of the control unit 902 (S108).

If a display of the third broadcast program 'sports' is requested by a viewing reservation, the control unit 902 checks whether to store the previously displayed 'drama' and 'news' while the 'sports' is displayed (S114).

If a storage of the previously displayed broadcast program 'news' is not requested for a period of displaying the 'sports', a size 1322 for a period T3–T2 between a timing point T2 of starting to display the 'news' and a timing point T3 of starting to display the 'sports' is just stored in the storage unit 924 by TS. Yet, if a storage of the previously displayed broadcast program 'news' is requested' for a period of displaying the 'sports', the 'sports' is displayed instead of the 'news' for a period R3 from a timing point T3 of setting a viewing reservation and stored by TS (S116). In this case, although the 'drama' and 'news' are not displayed while the 'sports' is displayed, they are received via two sub-tuners 604 and keep being stored in the storage unit 924 by NON-TS. Consequently, the size 1312 of 'drama' is stored in the storage unit 924 by TS for a period R2 of displaying the 'drama' and the size 1314 of the 'drama' is stored in the storage unit 924 by NON-TS for a period of not displaying 'drama'. So, it is able to store the total size of the 'drama' from the start to the end. Similarly, a size 1322 of the 'news' is stored by TS for a period R2 of displaying the 'news' and the rest size 1324 of 'the news' is stored by NON-TS for a period of not displaying the 'news'. Hence, it is able to store a total size of the 'news' from the start to the end.

The second storing type is explained as follows.

First of all, the method shown in FIG. 1 is performed for the periods R1 and R4, the method shown in FIG. 2 is executed from the timing point T4, and the method shown in FIG. 2 is executed again from the timing point T3.

Referring to the bars 1400 to 1420, the first broadcast program 'drama' is displayed and stored by TS in the storage unit 924 for the period R1 from the timing point T1 (S102).

If the viewing-reserved second broadcast program 'news' exists while the 'drama' is displayed, the control unit 902 checks whether to store the 'drama' of which progress is overlapped with that of the 'news' for displaying the 'news' before the timing point T2 (S106).

If a storage of the 'drama' is requested for a period of displaying the 'news', the 'news' is displayed instead of the 'drama' from the timing point T2 of the viewing reservation setting and stored by TS (S108). In this case, although the 'drama' is not displayed for the period of displaying the 'news', the 'drama' is stored by NON-TS (S108).

If a display of the third broadcast program 'drama' is requested again at the timing point T4 by a user, it is checked whether to store the previously displayed second broadcast program 'news' while the 'drama' is displayed (S114).

If a storage of the 'news' is requested for a period R5 of displaying the 'drama' again, a size 1416 of the 'drama' is displayed instead of the 'news' for the period R5 from the timing point T4 and stored by TS. Yet, the 'news' is stored by NON-TS (S116).

If there exists a different fifth broadcast program 'sports' reserved for a viewing while the fourth broadcast program 'drama' is displayed, it is checked prior to the timing point T3 whether to store the previously displayed 'drama' and 'news' (S114).

If a storage of the 'drama' and 'news' is requested for a period of displaying the 'sports', the 'sports' is displayed instead of the 'drama' from the timing point T3 and stored by TS. While the 'sports' is stored by TS, the non-displayed 'drama' and 'news' are stored by NON-TS (S116).

So, sizes 1412 and 1416 of the drama are stored by TS for the displayed periods R1 and R5 and sizes 1414 and 1418 of the drama are stored by NON-TS for the non-displayed period. So, it is able to store the total size of the 'drama' from the start to the end. Similarly, a size 1422 of the 'news' is stored by TS for a period R4 of displaying the 'news' and the rest size 1424 of 'the news' is stored by NON-TS for a period of not displaying the 'news'. Hence, it is able to store a total size of the 'news' from the start to the end.

The third storing type is explained as follows.

First of all, the method shown in FIG. 1 is performed for the periods R1 and R2, the method shown in FIG. 2 is executed from the timing point T3, and the method shown in FIG. 2 is executed again from the timing point T5.

Referring to the bars 1500 to 1520, 'drama' is stored in the same manner of the aforesaid first storing type. The second broadcast program 'news' 1512 is displayed from a viewing reservation setting timing point T2 for a period R2 and simultaneously stored by TS (S108).

If a display of the third broadcast program 'sports' is requested by a viewing reservation, it is checked whether to store the previously displayed 'drama, and 'news' while the 'sports' is displayed (S114).

If the storage of the 'drama' and 'news' is requested for a period of displaying the 'sports', the 'sports' 1514 is displayed instead of the 'news' and stored by TS from the timing point T3. And, the previously displayed broadcast programs 'drama' and 'news' are stored by NON-TS (S116).

If a display of the fifth broadcast program 'news' is requested again at the timing point T5 by a user while the fourth broadcast program 'sports' is displayed, it is checked whether to store the previously displayed broadcast programs 'drama' and 'news' for a period of displaying the 'news' (S114).

If a storage of the 'drama' and 'sports' is requested for a period R7 of playing the 'news' again, the 'news' 1516 is displayed instead of the 'sports' and stored by TS for the period R7 from the timing point T5 and the 'sports' is stored by NON-TS for a period of not displaying the 'sports' (S116).

After the display of the 'news' has ended, a broadcast program broadcasted on the channel of the 'news' can keep being displayed or a display may be switched to the previously viewed broadcast program 'sports' as indicated by the bar 1500 shown in FIG. 4. So, the 'news' 1512 and 1516 is stored by TS for the periods R2 and R7 of displaying the 'news' and the 'news' 1514 is stored by NON-TS for the period R6 of not displaying the 'news'. Hence, a total size of the 'news' can be stored from the start to the end. Similarly, the 'sports' 1522 is stored by TS for the period R6 of displaying the 'sports' and the 'sports' 1524 is stored by NON-TS for the period of not displaying the 'sports'. Hence, a total size of the 'sports' can be stored from the start to the end.

Accordingly, the present invention provides the following effects or advantages.

First of all, when a broadcast program is being viewed, even if a display switching is executed due to an initiation of another viewing-reserved broadcast program of which progress is overlapped with that of the former broadcast program, the previously displayed broadcast program is received via a sub-tuner 604 and automatically stored by NON-TS in a storage unit 924. Hence, the present invention is able to avoid missing important contents of the previously displayed broadcast program according to the display switching attributed to the overlapped viewing reservation. And, it is also unnecessary to switch the channels to view the previously displayed broadcast program again.

Secondly, a currently displayed broadcast program is stored by TS as soon as it starts. And, a previously displayed broadcast program is stored by NON-TS as soon as a display switching occurs in switching a display to another broadcast program. Hence, the present invention enable a total broadcast size of a corresponding program to be completely stored.

Besides, a recording medium readable by a computer includes one of all kinds of storage devices in which data readable by a computer system are stored. As an example of the recording medium readable by a computer, there is ROM, RAM, CD-ROM, a magnetic tape, a floppy disc, an optical data storage device, or the like. And, the computer-readable recording medium also includes a recording medium implemented in a carrier wave format (e.g., transmission via Internet). And, the computer-readable recording medium can store codes, which are spread to a computer system connected via a network and a readable by spreading, to execute. And, a function program, code and code segments for the implementation of a user tracking method are easily inferred from programmers in the art of the present invention.

INDUSTRIAL APPLICABILITY

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of receiving a broadcast in processing a viewing-reserved broadcast program, comprising:
   tuning a first channel through a first tuner;
   displaying a first broadcast program received from the tuned first channel at a first time and storing the first broadcast program;
   when a viewing-reserved second broadcast program exists while the first broadcast program is displayed, tuning a second channel through the first tuner at a second time which is a timing point of setting a viewing reservation of the second broadcast program;
   displaying the second broadcast program received from the tuned second channel at the second time instead of the first broadcast program;
   storing the second broadcast program while the second broadcast program is displayed;
   tuning the first channel through a second tuner after the second time while the second broadcast program is displayed; and
   storing the first broadcast program having a progress overlapped with that of the second broadcast program received from the tuned first channel,
   wherein the first broadcast program received by the first tuner and the second tuner is combined and the combined first broadcast program is stored in an area of a storage unit.

2. The method of claim 1, wherein the first broadcast program is a program to which a viewing reservation is made by a user.

3. The method of claim 1, further comprising storing the first broadcast program by time shift while the first broadcast program is displayed.

4. The method of claim 1, wherein the second broadcast program is stored by time shift while the second broadcast program is displayed.

5. The method of claim 1, further comprising, prior to a display switching to the second broadcast program, checking whether to store the first broadcast program for a period of displaying the second broadcast program.

6. The method of claim 5, wherein whether to store the first broadcast program for the period of displaying the second broadcast program is set in advance by a user.

7. The method of claim 5, wherein whether to store the first broadcast program for the period of displaying the second broadcast program is requested by real time by a user.

8. The method of claim 7, wherein the checking whether to store the first broadcast program for a period of displaying the second broadcast program comprises the step of providing an OSD (on-screen display) picture for querying the user whether to store the first broadcast program for the period of displaying the second broadcast program, and
   wherein the user decides whether to store the first broadcast program for the period of displaying the second broadcast program via the OSD picture.

9. The method of claim 3, wherein a total size of the first broadcast program is stored from a start timing point of the first broadcast program and an end timing point of the first broadcast program.

10. An apparatus for receiving a broadcast in processing a viewing-reserved broadcast program, comprising:
    a first tuning unit configured to tune a first channel to receive a first broadcast program at a first time in response to a first tuning control signal, and to tune a second channel to receive a second broadcast program at a second time instead of the first channel in response to a second tuning control signal when a viewing-reserved second broadcast program exists while the first broadcast program is displayed, the second time being a timing point of setting a viewing reservation of the second broadcast program;
    a second tuning unit configured to tune the first channel to receive the first broadcast program after the second time;
    a memory configured to store information for a viewing reservation of the broadcast program;
    a storage unit configured to store the first broadcast program having a progress overlapped with that of the second broadcast program in response to a storage control signal; and
    a central processing unit configured to generate the tuning control signal and the storage control signal to correspond to the information,
    wherein the first broadcast program received by the first tuning unit and the second tuning unit is combined and the combined first broadcast program is stored in an area of the storage unit.

11. The apparatus of claim 10, wherein the storage unit stores the displayed broadcast program by time shift in response to the storage control signal.

12. The apparatus of claim 10, wherein the central processing unit checks whether a storage of the at least one previously displayed broadcast program is requested and wherein the central processing unit generates the storage control signal and the tuning control signal, corresponding to a result of the check and the information.

13. The apparatus of claim 12, further comprising an OSD (on-screen display) unit configured to generate an OSD picture querying whether to store the at least one previously displayed broadcast program under a control of the central processing unit.

14. The apparatus of claim 10, further comprising a user interface unit configured to receive a setting of the viewing reservation from a user, wherein the central processing unit generates the information using a status of the viewing reservation set by the user and wherein the central processing unit stores the generated information to be stored in the memory.

15. The apparatus of claim 10, wherein the storage unit stores the currently displayed broadcast program by time shift in response to the storage control signal.

16. The apparatus of claim 10, wherein the central processing unit further comprises:
   a control unit configured to generate the tuning control signal and the storage control signal, corresponding to the information and the display switching request signal; and
   a PVR (personal video recorder) control & encoder configured to control a broadcast program subscription to the storage unit and a read-out of the broadcast program from the storage unit in response to the storage control signal.

\* \* \* \* \*